Figure 1:
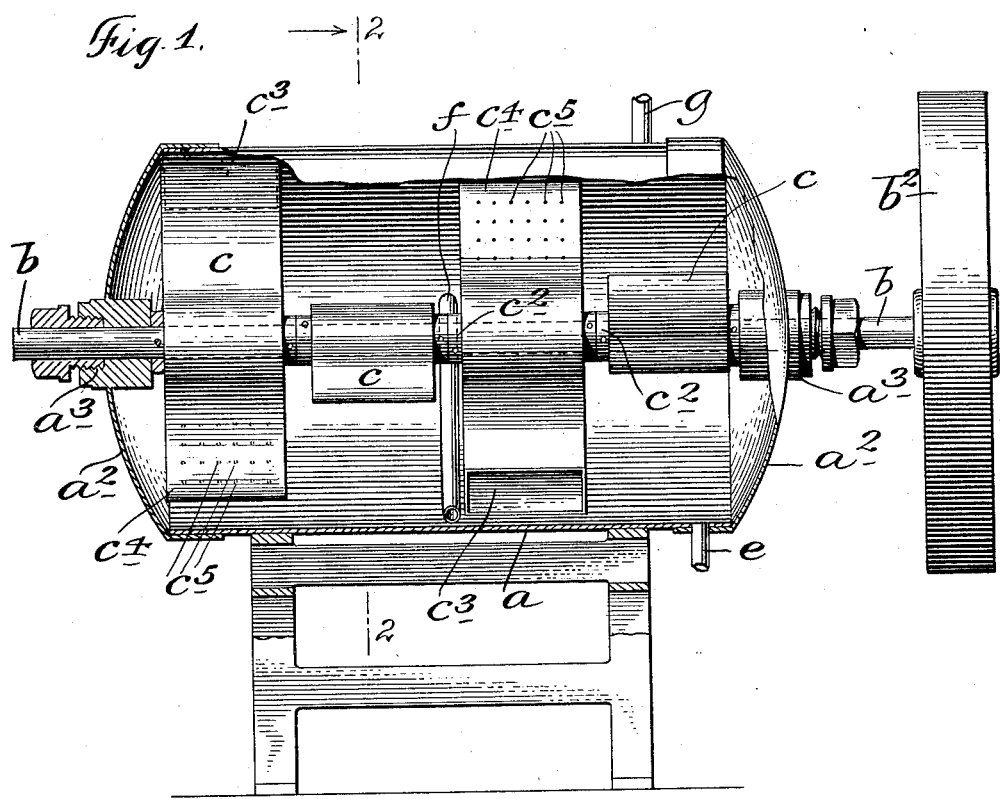

T. H. IRWIN.
APPARATUS FOR CARBONATING WATER.
APPLICATION FILED MAY 10, 1911.

1,007,701.

Patented Nov. 7, 1911.

WITNESSES
E. G. Bromley.
M. Appleman.

INVENTOR.
Thomas H. Irwin,
By Edgar Tate &Co.
ATTORNEYS.

UNITED STATES PATENT OFFICE.

THOMAS H. IRWIN, OF JERSEY CITY, NEW JERSEY.

APPARATUS FOR CARBONATING WATER.

1,007,701.  Specification of Letters Patent.  Patented Nov. 7, 1911.

Application filed May 10, 1911. Serial No. 626,186.

*To all whom it may concern:*

Be it known that I, THOMAS H. IRWIN, a citizen of the United States, and residing at Jersey City, in the county of Hudson and State of New Jersey, have invented certain new and useful Improvements in Apparatus for Carbonating Water, of which the following is a specification, such as will enable those skilled in the art to which it appertains to make and use the same.

This invention relates to an apparatus for carbonating water or beverages and which consists of an improvement applied to a mixing or carbonating tank whereby the operation of said tank is rendered more efficient and a proper carbonization of the water expeditiously effected.

The invention is fully disclosed in the following specification, of which the accompanying drawing forms a part, in which the separate parts of my improvement are designated by suitable reference characters in each of the views, and in which;—

Figure 2:
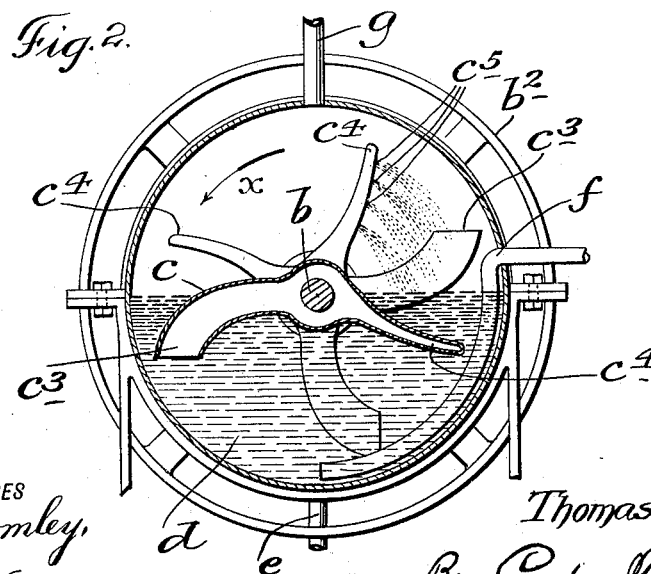

Figure 1 is a sectional side view of a tank used in the process of carbonating water and provided with my improvement, and;—Fig. 2 a cross sectional view of the line 2, 2 of Fig. 1.

In the drawing forming part of this specification, I have shown at $a$ an ordinary cylindrical tank such as is usually employed in the operation of carbonating water or other liquid substances, and this tank, in the form of construction shown is provided with convex heads $a^2$, and a shaft $b$ is passed centrally and longitudinally therethrough, and provided with a drive wheel $b^2$. The tank $a$ is provided with end stuffing boxes $a^3$ through which the shaft $b$ passes, and mounted on said shaft within said tank are a plurality of transverse arms $c$ which are provided with central hubs or bearings $c^2$, through which the shaft $b$ passes, and said arms are oblong and approximately rectangular in cross section, or in a section at right angles to the shaft $b$, and said arms $c$ are substantially wedge shape in form, the larger end portions $c^3$ thereof, being open and the smaller end portions $c^4$, being closed. The ends of the arms $c$ are curved in opposite directions and the openings $c^3$ in the larger ends of the arms $c$ are all turned in the same direction, and the direction of rotation of said arms and of the shaft $b$ is indicated by the arrow X in Fig. 2, and the backs of the smaller end portions $c^4$ of said arms are provided with perforations $c^5$, through which the water or other liquid is discharged in jets or sprays as the shaft $b$ and arms $c$ are rotated. With this construction, as the shaft $b$ and arms $c$ are rotated, the water or other liquid $d$ is scooped up by the open ends of the arms $c$ and forced out through the backs of the closed ends of said arms, and by reason of the fact that the said arms are tapered in longitudinal section, from one end to the other, the water or other liquid is also compressed in the smaller ends of said arms, and this causes said water or other liquid to be ejected through the perforations $c^5$ with considerable force. I have also shown at $g$, a pipe for supplying water or other liquid to the tank, and at $f$, an inlet for the carbonic acid gas, and at $e$ I have shown a discharge, or discharge outlet for the carbonated water, but my invention is not limited to these details of the construction, and the water or other liquid to be carbonated, and the carbonic acid gas may be introduced into the tank $a$ in any desired manner, and the carbonated water or other liquid may be removed from the tank in the usual or preferred way, my invention relating particularly to the arms $c$, mounted on the shaft $b$, and constructed and operating substantially as shown and described, whereby the water and gas are thoroughly mingled and the water completely carbonated.

Having fully described my invention, what I claim as new and desire to secure by Letters Patent, is;—

A tank for carbonating liquids, provided with a central rotatable shaft and a plurality of arms mounted transversely of said shaft and rotatable therewith, said arms being hollow and tapered from one end to the other, the larger ends of said arms being curved in the direction of rotation and open, and the backs of the opposite end portions of said arms being perforated.

In testimony that I claim the foregoing as my invention I have signed my name in presence of the subscribing witnesses this 9th day of May 1911.

THOMAS H. IRWIN.

Witnesses:
C. E. MULREANY,
G. A. MANDEVILLE.

Copies of this patent may be obtained for five cents each, by addressing the "Commissioner of Patents, Washington, D. C."